United States Patent
Jeong et al.

(10) Patent No.: US 12,542,784 B2
(45) Date of Patent: Feb. 3, 2026

(54) CALCULATION SYSTEM OF USER-CUSTOMIZED USAGE RIGHT FOR CLOUD SECURITY AND INTEGRATED SYSTEM FOR OPTIMIZING USAGE RIGHT INCLUDING SAME

(71) Applicant: OKESTRO CO., LTD., Seoul (KR)

(72) Inventors: A Ron Jeong, Seoul (KR); Sang Yong Lee, Seoul (KR); Do Hoon Kim, Seoul (KR); Young Gwang Kim, Seoul (KR); Min Jun Kim, Seoul (KR)

(73) Assignee: OKESTRO CO., LTD., Seoul (KR)

( * ) Notice: Subject to any disclaimer, the term of this patent is extended or adjusted under 35 U.S.C. 154(b) by 152 days.

(21) Appl. No.: 18/513,099

(22) Filed: Nov. 17, 2023

(65) Prior Publication Data

US 2025/0106218 A1    Mar. 27, 2025

(30) Foreign Application Priority Data

Sep. 22, 2023   (KR) .................... 10-2023-0127009

(51) Int. Cl.
*H04L 9/40* (2022.01)
(52) U.S. Cl.
CPC .......... *H04L 63/102* (2013.01); *H04L 63/108* (2013.01); *H04L 63/20* (2013.01)
(58) Field of Classification Search
CPC ...... H04L 63/102; H04L 63/108; H04L 63/20
See application file for complete search history.

(56) References Cited

U.S. PATENT DOCUMENTS

| | | | | |
|---|---|---|---|---|
| 8,555,343 | B2* | 10/2013 | Yang | H04L 47/521 |
| | | | | 726/3 |
| 11,539,540 | B1* | 12/2022 | Decrop | H04L 67/535 |
| 2017/0004182 | A1* | 1/2017 | Simpson | G06F 16/248 |
| 2017/0277568 | A1* | 9/2017 | Lu | G06F 9/50 |
| 2018/0288063 | A1* | 10/2018 | Koottayi | G06F 21/50 |

FOREIGN PATENT DOCUMENTS

| | | |
|---|---|---|
| KP | 10-2179497 B1 | 11/2020 |
| KR | 10-2394365 B1 | 5/2022 |
| KR | 10-2022-0100227 A | 7/2022 |
| KR | 10-2418961 B1 | 7/2022 |
| KR | 10-2461050 B1 | 10/2022 |

* cited by examiner

*Primary Examiner* — Nicholas R Taylor
*Assistant Examiner* — Tania M Pena-Santana
(74) *Attorney, Agent, or Firm* — Sughrue Mion, PLLC (57) ABSTRACT

A calculation system that calculates a usage right for resources of a cloud server by a user using a cloud service according to an embodiment of the present disclosure may include: a reception module that generates analysis activity information, which is activity information generated while the user uses the cloud server, in order to determine the usage right; a right module that uses a predetermined analysis method based on the analysis activity information to calculate a corresponding right, which is the usage right corresponding to the analysis activity information and applicable only to a specific user; and a transmission module that transmits a recommendation right calculated utilizing the corresponding right through a predetermined path.

7 Claims, 6 Drawing Sheets

CALCULATION SYSTEM OF USER-CUSTOMIZED USAGE RIGHT FOR CLOUD SECURITY AND INTEGRATED SYSTEM FOR OPTIMIZING USAGE RIGHT INCLUDING SAME

CROSS-REFERENCE TO RELATED APPLICATION(S)

This application is based on and claims priority under 35 U.S.C. § 119 to Korean Patent Application No. KR10-2023-0127009, filed on Sep. 22, 2023, in the Korean Intellectual Property Office, the entire disclosure of which is herein incorporated by reference in its entirety.

TECHNICAL FIELD

The present disclosure relates to a calculation system for calculating and managing a usage right for users using cloud services to access a cloud server and an integrated system for optimizing the usage right including the same.

BACKGROUND

As Internet networks become faster and more popular and various types of computing devices are used, the demand for cloud services is rapidly increasing. The cloud service refers to a service that uses computing resources through a server, excluding the function of a user interface. Depending on the scope of use, the cloud service is divided into types such as SaaS (Software as a Service), PaaS (Platform as a Service), and IaaS (Infrastructure as a Service).

Herein, the cloud service has the advantage of being able to be used anywhere where an Internet network is connected, but on the contrary, the cloud service has the disadvantage of allowing external intruders to access the cloud server through various paths. In addition, because users may use cloud services even in places other than a company where there are no security facilities, there are difficulties in managing security for cloud services.

RELATED ART DOCUMENT

Patent Document (Patent Document 0001) Korean Patent Application Publication No. 10-2022-0100227 (published on Jul. 15, 2022)

SUMMARY

The present disclosure is directed to addressing an issue associated with the related art, and to providing a system for calculating a user-customized usage right to provide cloud services with increased security and an integrated system for optimizing the usage right including the same.

A calculation system that calculates a usage right for resources of a cloud server by a user using a cloud service according to an embodiment of the present disclosure includes: a reception module that generates a analysis activity information, which is activity information generated while the user uses the cloud server, in order to determine the usage right; a right module that uses a predetermined analysis method based on the analysis activity information to calculate a corresponding right, which is the usage right corresponding to the analysis activity information and applicable only to a specific user; and a transmission module that transmits the recommendation right calculated utilizing the corresponding right through a predetermined path.

In addition, the analysis activity information may be log data generated while a user uses the cloud service in a state where the user is granted full usage rights to the resources of the cloud server.

In addition, the predetermined analysis method may be a method of utilizing a language model based on natural language processing to calculate the corresponding right by comparing the analysis activity information with the usage right granted in the past and the activity information generated when the usage right was granted in the past.

In addition, the predetermined analysis method may be a method of calculating the corresponding right using deep learning and a calculation model learned based on the usage right granted in the past and the activity information generated when the usage right was granted in the past.

In addition, there is included: a prediction module that calculates a prediction right, which is a right to be imposed on the user, based on information about tasks undertaken by the user; and an inspection module that determines whether a predetermined trust condition that determines trust of the user is satisfied when a predetermined inspection condition determined by comparing the prediction right and the corresponding right is satisfied, wherein, when the predetermined inspection condition is satisfied, the right module may determine the corresponding right as the recommendation right only when the predetermined trust condition is satisfied.

In addition, the predetermined inspection condition may be a condition in which a size of the corresponding right is larger than a size of the prediction right by a predetermined size.

In addition, the right module may calculate the corresponding right respectively based on a computing device connecting the cloud server, and the predetermined trust condition may include a first trust condition, which is a condition that sizes of the corresponding rights calculated for each computing device do not differ by more than a first reference size, which is a predetermined size.

In addition, the right module may calculate the corresponding right respectively according to a time interval, and the predetermined trust condition may further include a second trust condition, which is a condition that sizes of the corresponding rights calculated respectively according to the time interval do not differ by more than a second reference size, which is a predetermined size.

In addition, the predetermined inspection condition may include: a first inspection condition that is a condition in which the size of the corresponding right is larger than the size of the prediction right by a predetermined standard size or less; and a second inspection condition that is a condition in which the size of the corresponding right is larger than the size of the prediction right by exceeding the standard size. The inspection module may determine whether the first trust condition is satisfied when the first inspection condition is satisfied, and determine whether the first trust condition and the second trust condition are satisfied when the second inspection condition is satisfied.

In addition, the transmission module may transmit a notification to a predetermined manager when the predetermined inspection condition is satisfied but the predetermined trust condition is not satisfied.

In addition, the right module may determine the prediction right as the recommendation right when the size of the corresponding right is smaller than the size of the prediction right.

The integrated system for optimizing a usage right according to an embodiment of the present disclosure may include: a calculation system that calculates the usage right for resources of a cloud server to be recommended to a user using a cloud service; and a management system that controls the cloud server so that the user is able to use the cloud server only within a recommendation right calculated by the calculation system, wherein the calculation system may include: a reception module that receives analysis activity information, which is activity information generated while the user uses the cloud server, in order to determine the usage right; a right module that uses a predetermined analysis method based on the analysis activity information to calculate a corresponding right, which is the usage right corresponding to the analysis activity information and applicable only to a specific user; and a transmission module that transmits the recommendation right calculated utilizing the corresponding right through a predetermined path.

The calculation method according to an embodiment of the present disclosure is implemented by a calculation system and is configured for a user using a cloud service to calculate a usage right for resources of a cloud server, wherein the method includes: receiving, by a reception module, analysis activity information, which is activity information generated while the user uses the cloud server, in order to determine the usage right; calculating, by a right module, a corresponding right, which is the usage right that correspond to the analysis activity information using a predetermined analysis method based on the analysis activity information and applicable only to a specific user; and transmitting, by a transmission module, a recommendation right calculated utilizing the corresponding right to a predetermined path.

The calculation system of the user-customized usage right according an embodiment of the present disclosure and the integrated system for optimizing the usage right including the same can increase security.

In addition, the reliability of cloud services can be improved.

In addition, the possibility of resource leakage can be reduced.

In addition, work efficiency can be increased.

However, the benefits of the present disclosure are not limited to those mentioned above, and other benefits not mentioned herein will be clearly understood by those skilled in the art from the following description and the attached drawings.

DETAILED DESCRIPTION

Hereinafter, specific embodiments of the present disclosure will be described in detail with reference to the drawings. However, the spirit of the present disclosure is not limited to the presented embodiments, and those skilled in the art who understand the spirit of the present disclosure will be able to easily suggest other regressive inventions or other embodiments included within the scope of the present disclosure by adding, changing, or deleting other components within the scope of the same spirit, but this will also be said to be included within the scope of the spirit of the present disclosure.

Figure 1:
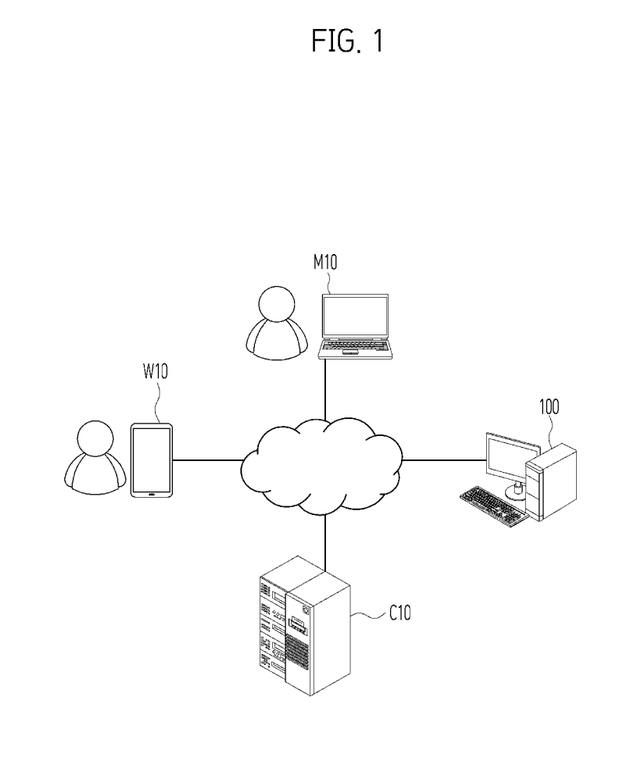
FIG. 1 is a relationship diagram of an integrated system for optimizing a usage right according to an embodiment of the present disclosure.

FIG. 1 is a relationship diagram of an integrated system for optimizing a usage right according to an embodiment of the present disclosure.

Referring to FIG. 1, an integrated system 100 for optimizing a usage right according to an embodiment of the present disclosure may be networked to enable wired/wireless information communication with a cloud server C10 and a manager M10.

The wireless network mentioned in an embodiment of the present disclosure may be a core network integrated with a wired public network, a wireless mobile communication network, or a mobile Internet, and may refer to a worldwide open computer network structure that provides TCP/IP protocols and various services existing at the upper layer thereof, such as HTTP (Hyper Text Transfer Protocol), HTTPS (Hyper Text Transfer Protocol Secure), Telnet, FTP (File Transfer Protocol), DNS (Domain Name System), and SMTP (Simple Mail Transfer Protocol). The wireless network is not limited to examples, but comprehensively refers to a data communication network that may transmit and receive data in various forms.

The cloud server C10 may refer to a server that provides cloud services.

The server mentioned in an embodiment of the present disclosure may include other components for performing a server environment. The server may include all arbitrary types of devices.

For example, the server as a digital device may be a digital device with a calculation capability, which has a processor installed therein and a memory, such as a laptop computer, a notebook computer, a desktop computer, a web pad, or a mobile phone.

In one example, the server may be a web server. However, it is not limited thereto, and the type of server may be changed in various ways at a level that is obvious to those skilled in the art.

The manager M10 may refer to a provider that provides cloud services by managing and operating the cloud server C10.

Hereinafter, the manager M10 may mean including a computing device used by the manager.

The computing device mentioned in an embodiment of the present disclosure may mean a device capable of processing information processing operations.

For example, computing devices may include mobile terminals including desktop computers, laptops, smartphones, PDAs (Personal Digital Assistants), PMPs (Portable Multimedia Players), portable terminals, and/or smart TVs.

The user W10 may refer to a consumer who uses a cloud service.

Hereinafter, the user W10 may refer to a computing device used by a user.

The user W10 can utilize the resources of the cloud server only within the usage right set by the manager M10.

The resources of the cloud server C10 may include all hardware resources, software resources, and virtual machine resources provided by the cloud server.

In addition, the resources of the cloud server C10 may include data stored in the cloud server.

The integrated system 100 for optimizing the usage right may present a recommendation right, which is the usage right appropriate to a user to a manager. In addition, by being manipulated by a manager, the cloud server may be controlled so that a user may access the resources of the cloud server only as much as the recommendation right.

Hereinafter, the integrated system for optimizing the usage right will be described in detail.

Figure 2:
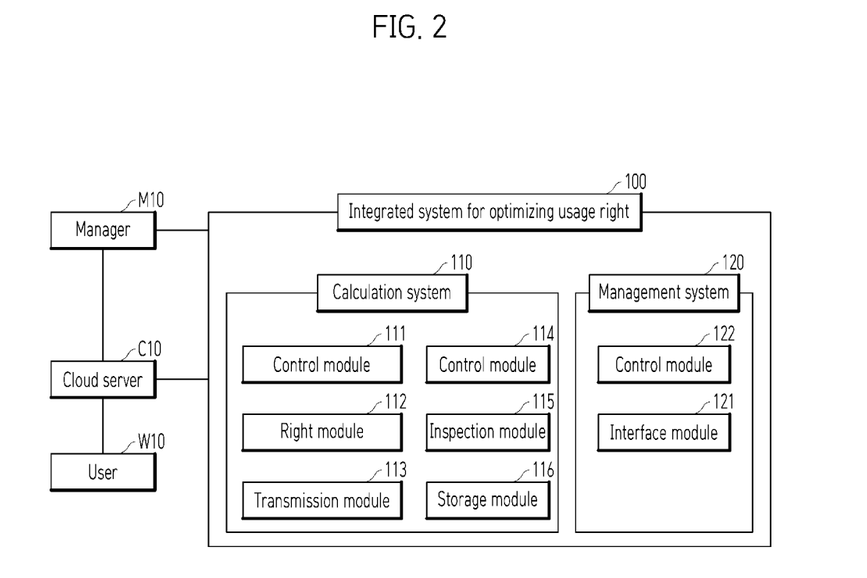
FIG. 2 is a configuration diagram of the integrated system for optimizing the usage right according to an embodiment of the present disclosure.

FIG. 2 is a configuration diagram of the integrated system for optimizing the usage right according to an embodiment of the present disclosure.

Referring to FIG. 2, the integrated system for optimizing the usage right according to an embodiment of the present disclosure may include: a calculation system 110 that calculates the usage right for resources of a cloud server to be recommended to a user using a cloud service; and a management system 120 that controls the cloud server so that the user is able to use the cloud server only within a recommendation right calculated by the calculation system 110.

The usage right calculation system 110 according to an embodiment of the present disclosure may calculate the usage right for resources of a cloud server to be recommended to a user using a cloud service, and include: a reception module 111 that generates analysis activity information, which is activity information generated while a user uses a cloud server, in order to determine the usage right in a calculation system that calculates the usage right for resources of the cloud server by the user using a cloud service; a right module 112 that uses a predetermined analysis method based on the analysis activity information to calculate a corresponding right, which is the usage right corresponding to the analysis activity information and applicable only to a specific user; and a transmission module 113 that transmits a recommendation right calculated utilizing the corresponding right through a predetermined path.

In addition, the integrated system for optimizing the usage right may include: a prediction module 114 that calculates a prediction right, which is a right to be imposed on the user, based on information about tasks undertaken by the user; an inspection module 115 that determines whether a predetermined trust condition that determines trust of the user is satisfied when a predetermined inspection condition determined by comparing the prediction right and the corresponding right is satisfied; and a storage module 116 that stores the information needed to implement a predetermined analysis method.

Herein, each module may transmit and receive data with each other.

The reception module 111 may generate analysis activity information, which is activity information generated while a user uses a cloud service.

Specifically, the reception module 111 may receive log data or metric data generated while a user uses a cloud service from a cloud server and generate analysis activity information.

The reception module 111 may store analysis activity information in time series and transmit the same to the storage module 116 or the right module 112.

For example, the reception module 111 may generate analysis activity information utilizing AWS Cloud Trial software.

However, it is not limited to this, and the type of software used by the reception module 111 may be modified in various ways at a level that is obvious to those skilled in the art.

The analysis activity information may be log data generated when a user uses a cloud service while the user is granted full usage rights to the resources of the cloud server.

To this end, a control module 122 of the management system 120 may control the cloud server so that a user is granted full rights to the resources of the cloud server for a predetermined period of time.

In one example, the predetermined period of time may be 10 days.

However, it is not limited to thereto, and a specific numerical value of the predetermined period of time may be modified in various ways at a level that is obvious to those skilled in the art.

Alternatively, the control module 122 of the management system 120 may control the cloud server so that a user is granted full rights to the resources of the cloud server until a predetermined amount of data is collected.

The predetermined amount of data may be the minimum amount of data that may utilize a predetermined analysis method.

The right module 112 may use a predetermined analysis method to calculate a corresponding right, which is a usage right that corresponds to analysis activity information and applies only to a specific user.

The predetermined analysis method may be a method of utilizing a language model based on natural language processing to calculate the corresponding right by comparing the analysis activity information with the usage right granted in the past and the activity information generated when the usage right was granted in the past.

To this end, the usage right granted in the past and activity information generated when the usage right was granted in the past may be received from the storage module 116.

The right module 112 may analyze the pattern of the analysis activity information and match the analysis activity information with the corresponding past activity information. The right to use the past activity information corresponding to the analysis activity information may be calculated as the corresponding right, which is the usage right corresponding to the cloud server usage pattern of a user.

Alternatively, the predetermined analysis method may be a method of calculating the corresponding right using deep learning and a calculation model learned based on the usage right granted in the past and the activity information generated when the usage right was granted in the past.

For example, the usage right may be divided into levels 1 to 10, and the higher the level, the greater the usage right and the more resources of the cloud server the user may access.

Conversely, the lower the level, the smaller the usage right and the fewer resources of the cloud server the user may access.

For example, the usage right may specify a specific list of resources through which a user may access cloud resources. This may be specified for each of hardware resources, software resources, virtual machine resources, and stored files.

For example, the usage right may be separately specified to the scope of modifying, deleting, or copying accessible resources or files.

The greater the usage right, the greater the number of resources of the cloud server the user may access.

Conversely, the smaller the usage right, the smaller the number of resources of the cloud server the user may access.

Herein, the deep learning may use the Back Propagation algorithm, which is an algorithm that updates the weights of the neural network using labeled data of the output layer, but is not limited thereto.

In addition, since the deep neural network and Back Propagation algorithm are known in the art, the detailed description thereof may be omitted.

For example, the calculation model may calculate activity information similar to the pattern or embedding vector value of the analysis activity information, and calculate, as the corresponding right, the right that differs from the usage right when having the most similar activity information by the similar difference value of the activity information selected as similar to the analysis activity information.

The right module 112 may calculate the corresponding right by inputting analysis activity information into the calculation model.

The right module 112 may determine the corresponding right as the recommendation right only when the predetermined inspection condition is satisfied and the predetermined trust condition is satisfied.

When the predetermined inspection condition is satisfied but the predetermined trust condition is not satisfied, the right module 112 may not determine recommendation right. The right module 112 may deliver the necessary signal to the transmission module 113 so that the transmission module 113 may transmit an alarm to a manager.

To this end, the right module 112 may receive information from the inspection module 115 about whether predetermined inspection conditions are satisfied and whether predetermined trust conditions are satisfied.

When the predetermined inspection condition is satisfied, the right module 112 may determine the recommendation right based on the determination result of the predetermined trust condition received from the inspection module 115.

The right module 112 may calculate the corresponding right based on the computing device of a user connecting the cloud server.

This may be because a user may access the cloud server while changing locations.

In one example, the classification of computing devices may be based on IP addresses.

However, without being limited thereto, the classification of computing devices may be based on the ID with which a user logs in.

The right module 112 may calculate the corresponding right according to each time interval.

Specifically, the right module 112 may input analysis activity information classified according to time intervals into a calculation model and calculate the corresponding right for each time interval.

For example, the time interval may be classified into four time intervals: 0:00 to 6:00, 6:00 to 12:00, 12:00 to 18:00, and 18:00 to 24:00.

However, it is not limited thereto, and the specific time classification may be modified in various ways at a level that is obvious to those skilled in the art.

Herein, the right module 112 may calculate the corresponding right according to the time interval without classifying the computing device of a user.

This may be to analyze the usage patterns of a user over time.

When the size of the corresponding right is smaller than the size of the prediction right, the right module 112 may determine the prediction right as the recommendation right.

This may be a phenomenon that mainly occurs when a user has a cautious personality when the corresponding right is smaller than the prediction right determined based on the tasks of the user.

Accordingly, for task efficiency, the right module 112 may determine the prediction right as the recommendation right.

The transmission module 113 may transmit the recommendation right to the management system 120.

Additionally, the transmission module 113 may transmit a notification to a predetermined manager when the predetermined inspection condition is satisfied but the predetermined trust condition is not satisfied.

The prediction module 114 may calculate the prediction right, which is the usage right to be imposed on a user, based on task information, which is information about tasks undertaken by the user.

Herein, the task information, which is information about the task undertaken by a user may include all of information about a position of a user in a company, information about work undertaken by the user, information about the team to which the user is assigned, and information about a project including the work undertaken by the user.

For example, the information about the position of the user in the company may be information about positions such as manager, employee, assistant manager, etc.

For example, the information about the work undertaken by the user may mean specific work contents, such as organizing a list of major competitors and identifying competitor trends.

For example, the information about the team to which the user is assigned may mean a name that distinguishes the team, such as patent team or trademark team.

For example, the information about the project including the work undertaken by the user may mean a name of the project and the specific work contents undertaken by the user when performing the project.

For example, task information, which is information about the task undertaken by a user, may consist of letters, and the prediction module 114 may extract the necessary information through OCR or window sizing.

The prediction module 114 may label past task information and usage rights granted to a user with the task information and perform deep learning as learning data to train a prediction model.

The past work information needed to learn the prediction model and information on usage rights corresponding to the task information may be stored in the storage module 116.

The prediction module 114 may calculate the prediction right by inputting the task information of a user subject to analysis into the prediction model.

The prediction right may refer to an expected usage right considering the task undertaken by a user.

When the predetermined inspection condition is satisfied, the inspection module 115 may determine whether the predetermined trust condition is satisfied.

When the predetermined inspection condition is satisfied, the inspection module 115 may determine whether the predetermined trust condition is satisfied and deliver the determination result to the right module 112.

The predetermined inspection condition may be a condition in which the size of the corresponding right is larger than the size of the prediction right by a predetermined size.

Specifically, the predetermined inspection condition may include: a first inspection condition that is a condition in which the size of the corresponding right is larger than the size of the prediction right by a predetermined standard size or less; and a second inspection condition that is a condition in which the size of the corresponding right is larger than the size of the prediction right by exceeding the standard size.

For example, when the usage rights are classified into arbitrary levels, the standard size may be level 2.

For example, when the usage rights are classified as specifying specific resource lists, the standard size may be specified as a number depending on the type of resources.

However, it is not limited thereto, and specific examples of standard sizes may be modified in various ways at a level that is obvious to those skilled in the art.

The predetermined trust condition may include: a first trust condition, which is the condition that sizes of the corresponding rights calculated for each computing device do not differ by more than the first reference size, which is a predetermined size; and a second trust condition, which is the condition that the sizes of the corresponding rights calculated according to a time interval do not differ by more than the second reference size, which is a predetermined size.

For example, when the usage rights are classified into arbitrary levels, the first reference size may be level 2.

For example, when the usage rights are classified into arbitrary levels, the second reference size may be level 2.

The first reference size and the second reference size may be the same, but an embodiment of the present disclosure is not limited thereto, and the first reference size and the second reference size may be different from each other.

When the first inspection condition is satisfied, the inspection module 115 may determine whether a first trust condition is satisfied.

When the first inspection condition is satisfied, the inspection module 115 may deliver information to the right module 112 that a user may be trusted only when the first trust condition is satisfied.

In addition, when the second inspection condition is satisfied, the inspection module 115 may determine whether the first trust condition and the second trust condition are satisfied.

When the second inspection condition is satisfied, the inspection module 115 may deliver information that a user may be trusted to the right module 112 only when both the first trust condition and the second trust condition are satisfied.

The storage module 116 may store all pieces of information necessary to implement the calculation method.

In one example, the storage module may include an embedded memory and/or an external memory.

For example, the embedded memory may include at least one of a volatile memory (e.g., DRAM, SRAM, SDRAM, or the like), a non-volatile memory (e.g., one time programmable ROM (OTPROM), a PROM, an EPROM, an EEPROM, a mask ROM, a flash ROM, a flash memory, a hard drive, and a solid-state drive (SSD).

The external memory may include a flash drive, for example, a compact flash (CF) memory, a secure digital (SD) memory, a micro-SD memory, a mini-SD memory, an extreme digital (xD) memory, a multi-media card (MMC) memory, or a memory stick.

The storage module 116 may store analysis activity information in time series and store recommendation rights corresponding to the analysis activity information.

Information stored in the storage module 116 may be utilized in the learning process of the calculation model.

For example, the storage module 116 may utilize AWS IAM software to store and manage usage rights granted in the past and activity information generated when the usage rights were granted in the past.

However, it is not limited thereto, and the type of software utilized by the storage module 116 may be modified in various ways at a level that is obvious to those skilled in the art.

The management system 120 according to an embodiment of the present disclosure may include: an interface module 121 that displays a recommendation right received from the calculation system 110 to a manager and calculates an interface capable of receiving manager approval to allow a user to use resources of a cloud server only within the recommendation right; and a control module 122 that controls the cloud server.

The interface module 121 may calculate an interface through which a recommendation right is displayed to a manger and provide the same to the manager.

The interface module 121 may calculate an interface that notifies a manager of information about a user with security risks based on the notification signal received from the transmission module 113 and provide the same to the manager.

In addition, the interface module 121 may calculate and provide an interface that allows a manager to set the usage right of a user to the manager.

In addition, the interface module 121 may calculate and provide an interface through which a user may approve a recommendation right to a manager.

The control module 122 may control the cloud server so that a user may access the resources of the cloud server according to a recommendation right.

However, the control module 122 is not limited thereto and may control the cloud server so that a user may access the resources of the cloud server according to the command of a manager.

In other words, the control module 122 may control the cloud server based on the usage right of a manager approved and designated in detail by the manager.

A manger may approve the recommendation right proposed by the interface module 121 as is, or may separately set the usage right for a user in detail.

Hereinafter, the process of calculating a recommendation right by the calculation system 110 will be described in detail.

Figure 3:
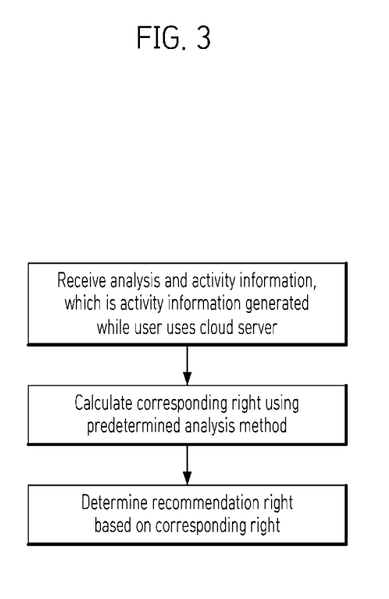
FIG. 3 is a flowchart of a calculation method implemented by a calculation system of the integrated system for optimizing the usage right according to an embodiment of the present disclosure.

FIG. 3 is a flowchart of a calculation method implemented by a calculation system of the integrated system for optimizing the usage right according to an embodiment of the present disclosure.

Referring to FIGS. 2 and 3, the calculation method according to an embodiment of the present disclosure is implemented by the calculation system 110 and is configured for a user using a cloud service to calculate a usage right for resources of a cloud server, wherein the method includes: receiving, by the reception module 111, analysis activity information, which is activity information generated while the user uses the cloud server, in order to determine the usage right; calculating, by the right module 112, a corresponding right, which is the usage right that correspond to the analysis activity information using a predetermined analysis method based on the analysis activity information and apply only to a specific user; and transmitting, by the transmission module 113, a recommendation right calculated utilizing the corresponding right to a predetermined path.

To be specific, analysis activity information may be collected and generated by the reception module 111, and the analysis activity information may be transmitted to the right module 112.

In addition, the reception module 111 may receive information about the tasks of a user and deliver the same to the prediction module 114.

Along therewith, the prediction module 114 may calculate a prediction right by inputting information about the tasks of a user into the prediction model.

The right module 112 may calculate a corresponding right based on the analysis activity information.

Herein, when the prediction right and the corresponding right are the same, the right module 112 may determine the corresponding right as a recommendation right.

When the prediction right and the corresponding right are different from each other, the right module 112 may not immediately determine the corresponding right as a recommendation right.

Figure 4:
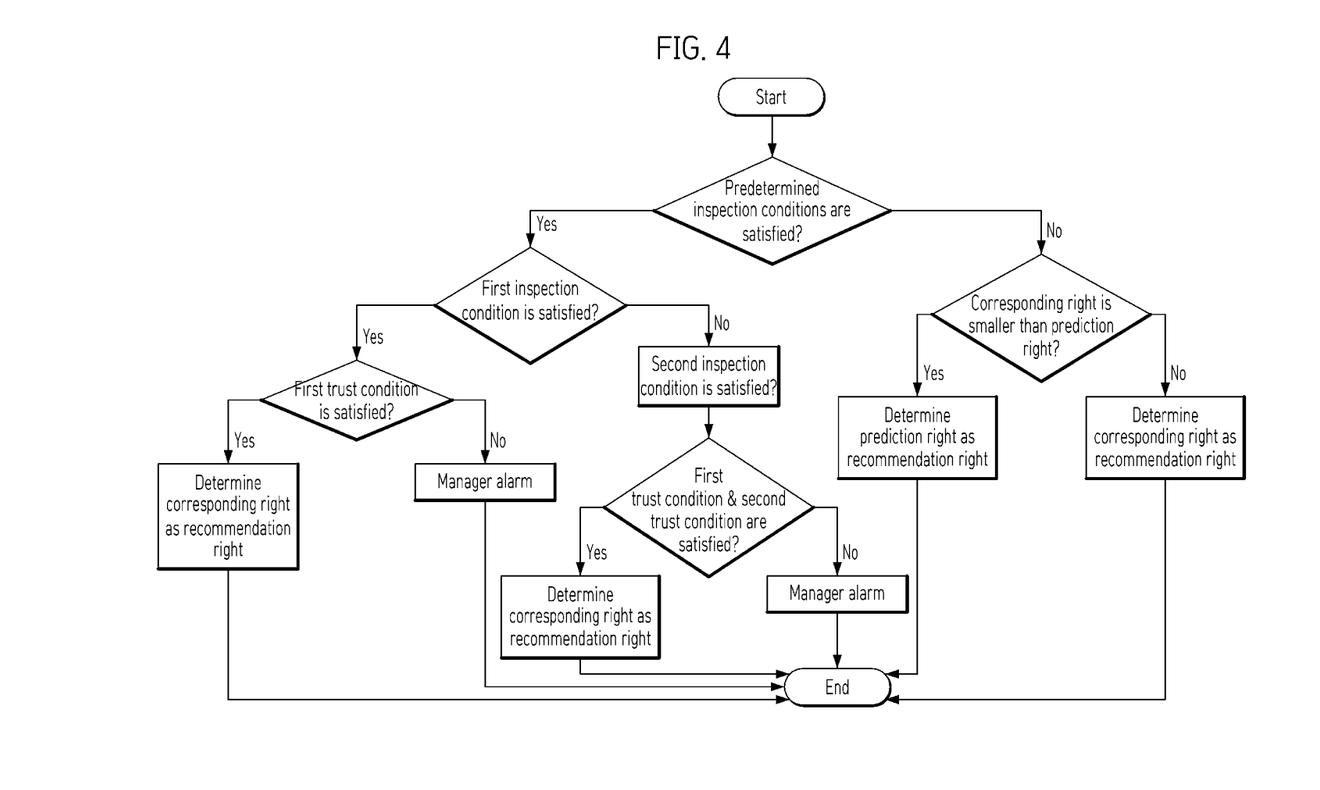
FIG. 4 is a flowchart of the method when predetermined inspection conditions are satisfied among the calculation methods according to an embodiment of the present disclosure.
Figure 5:
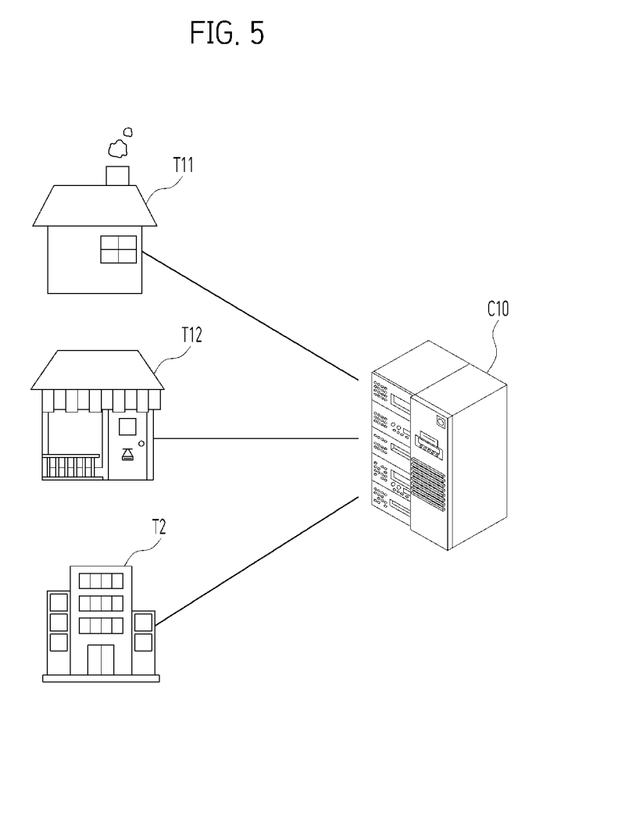
FIG. 5 is a diagram for explaining a first trust condition in the method of FIG. 4.
Figure 6:
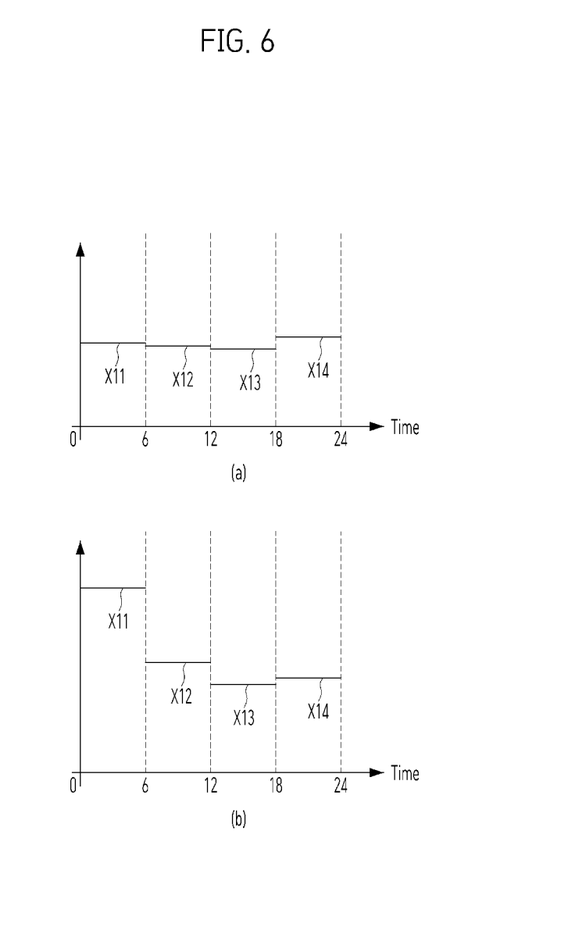
FIG. 6 is a diagram for explaining a second trust condition in the method of FIG. 4.

FIG. 4 is a flowchart of the method when predetermined inspection conditions are satisfied among the calculation methods according to an embodiment of the present disclosure. FIG. 5 is a diagram for explaining a first trust condition in the method of FIG. 4. FIG. 6 is a diagram for explaining a second trust condition in the method of FIG. 4.

Referring to FIGS. 2 and 4, when the predetermined inspection condition is not satisfied and the size of the corresponding right is smaller than the size of the prediction right, the right module 112 may determine the prediction right as the recommendation right.

In addition, when the predetermined inspection condition is not satisfied and the size of the corresponding right is the same as the size of the prediction right, the right module 112 may determine the corresponding right as the recommendation right.

Alternatively, when the predetermined inspection condition is satisfied, the right module 112 may determine the recommendation right based on the determination of the inspection module 115.

When the first inspection condition is satisfied, the inspection module 115 may determine whether the first trust condition is satisfied.

The first trust condition may be a condition in which the sizes of the corresponding rights calculated for each computing device of a user do not differ by more than a first reference size, which is a predetermined size.

For example, referring to FIG. 5, a user may receive cloud services by connecting to the cloud server C10 through a computing device T11 installed at home, a computing device T12 operated in a cafe or shared office, and a computing device T13 operated at a company. You can connect to receive cloud services.

The right module 112 may input the analysis activity information of each of the computing device T11 installed at home, the computing device T12 operated in a cafe or shared office, and the computing device T13 operated at a company into a calculation model, and calculate a corresponding right for each computing device.

For example, the corresponding right for calculating a recommendation right may be calculated for all of the computing devices of a user, and the corresponding right may be calculated for each computing device of a user to determine whether the user may be trusted.

The inspection module 115 may determine whether each size of the size of a corresponding right corresponding to the computing device T11 installed at home, the size of a corresponding right corresponding to the computing device T12 operated in a cafe or shared office, and the size of a corresponding right corresponding to the computing device T13 operated in a company differs by more than the first reference size.

Specifically, the inspection module 115 may determine whether the size of the corresponding right corresponding to the computing device T11 installed at home and the size of the computing device T12 operated in a cafe or shared office differ by more than the first reference size, whether the size of the corresponding right corresponding to the computing device T11 installed at home and the size of the computing device T13 operated in a company differ by more than the first reference size, and whether the size of the corresponding right corresponding to the computing device T12 operated in a cafe or shared office and the size of the corresponding right corresponding to the computing device T13 operated in a company differ by more than the first reference size.

When the first inspection condition is satisfied and the first trust condition is satisfied, the right module 112 may determine the corresponding right as the recommendation right.

When the first inspection condition is satisfied and the first trust condition is not satisfied, the right module 112 may not determine the recommendation right, and the transmission module 113 may transmit an alarm to a manager about the abnormal use of a user.

When the first inspection condition is not satisfied and the second inspection condition is satisfied, the inspection module 115 may determine whether both the first trust condition and the second trust condition are satisfied.

A detailed description of the method for determining the first trust condition may be omitted to the extent that it overlaps with the aforementioned content.

The right module 112 may classify the analysis activity information of a user according to the time interval regardless of the computing device, input the analysis activity information classified according to the time interval into the calculation model, and calculate the corresponding right according to the time section.

For example, referring to FIG. 6, the time interval may be classified into four time intervals: 0:00 to 6:00, 6:00 to 12:00, 12:00 to 18:00, and 18:00 to 24:00.

The X-axis may represent time, and the Y-axis may represent a corresponding right.

Referring to FIG. 6(A), assuming that the corresponding right from 0 o'clock to 6 o'clock is a first corresponding right X11, the corresponding right from 6 o'clock to 12 o'clock is a second corresponding right X12, the corresponding right from 12 o'clock to 18 o'clock is a third corresponding right X13, and the corresponding right from 18 o'clock to 24 o'clock is a fourth corresponding right X14, the difference between the first corresponding right X11 to the fourth corresponding right X14 may not be greater than the second reference size.

Differently, referring to FIG. 6(B), the first corresponding right X11 and the second corresponding right X12 may differ by more than the second reference size. In this connection, the second trust condition may not be satisfied.

When the first inspection condition is not satisfied and the second inspection condition is satisfied, and the first trust condition and the second trust condition are satisfied, the right module 112 may determine the corresponding right as the recommendation right.

Differently, when at least one of the first trust condition and the second trust condition is not satisfied in the state where the first inspection condition is not satisfied and the second inspection condition is satisfied, the right module 112 may not determine the recommendation right. Instead, the transmission module 113 may transmit an alarm to a manager about the abnormal use of a user.

The transmission module 113 may transmit the recommendation right determined by the right module 112 to the management system 120.

As such, by determining the recommendation right based on the corresponding right and prediction right, the security efficiency of the cloud server may be maximized by setting customized and optimized usage rights for a user.

In the attached drawings, in order to more clearly express the technical idea of the present disclosure, configurations that are unrelated or less relevant to the technical idea of the present disclosure are briefly expressed or omitted.

Hereinabove, the configurations and features of the present disclosure have been described based on the embodiments according to the present disclosure, but the present disclosure is not limited thereto. It is obvious to those skilled in the art that various changes or modifications can be made within the spirit and scope of the present disclosure. Therefore, it is stated that such changes or modifications fall within the scope of the appended claims.

| Description of Reference Numerals | |
| --- | --- |
| 111: Reception module | 112: Right module |
| 113: Transmission module | 114: Prediction module |

What is claimed is:

1. A calculation system that calculates a usage right for resources of a cloud server by a user using a cloud service, the system comprising hardware resources that include a processor and a memory to implement:
    a reception module that generates a analysis activity information, which is activity information generated while the user uses the cloud server, in order to determine the usage right;
    a right module that uses a predetermined analysis method based on the analysis activity information to calculate a corresponding right, which is the usage right corresponding to the analysis activity information and applicable only to a specific user;
    a prediction module that calculates a prediction right, which is a right to be imposed on the user, based on information about tasks undertaken by the user;
    an inspection module that determines whether a predetermined trust condition that determines trust of the user is satisfied when a predetermined inspection condition determined by comparing the prediction right and the corresponding right is satisfied; and
    a transmission module that transmits a recommendation right calculated utilizing the corresponding right through a predetermined path,
    wherein the right module calculates the corresponding right respectively based on each computing device of the user connecting the cloud server and the corresponding right according to each time interval by utilizing the analysis activity information classified according to time intervals,
    wherein the predetermined inspection condition comprises a first inspection condition that is a condition in which a size of the corresponding right is larger than a size of the prediction right by a predetermined standard size or less, and a second inspection condition that is a condition in which the size of the corresponding right is larger than the size of the prediction right by exceeding the standard size,
    wherein the predetermined trust condition comprises a first trust condition, which is a condition that sizes of corresponding rights calculated for each computing device of the user do not differ by more than a first reference size, which is a predetermined size and a second trust condition, which is a condition that the sizes of the corresponding rights calculated according to a time interval do not differ by more than a second reference size, which is a predetermined size,
    wherein the right module determines the prediction right as the recommendation right when the size of the corresponding right is smaller than the size of the prediction right,
    wherein the right module determines the corresponding right as the recommendation right when the first inspection condition is satisfied and the first trust condition is satisfied, and
    wherein the right module determines the corresponding right as the recommendation right when the first inspection condition is not satisfied and the second inspection condition is satisfied, and the first trust condition and the second trust condition are satisfied.

2. The system of claim 1, wherein the analysis activity information is log data generated while the user uses the cloud service in a state where the user is granted full usage rights to the resources of the cloud server.

3. The system of claim 2, wherein the predetermined analysis method is a method of utilizing a language model based on natural language processing to calculate the corresponding right by comparing the analysis activity information with the usage right granted in the past and the activity information generated when the usage right was granted in the past.

4. The system of claim 2, wherein the predetermined analysis method is a method of calculating the corresponding right using deep learning and a calculation model learned based on the usage right granted in the past and the activity information generated when the usage right was granted in the past.

5. The system of claim 1, wherein the transmission module transmits a notification to a predetermined manager when the predetermined inspection condition is satisfied but the predetermined trust condition is not satisfied.

6. An integrated system for optimizing a usage right, the system comprising hardware resources that include a processor and a memory to implement:
    a calculation system that calculates the usage right for resources of a cloud server to be recommended to a user using a cloud service; and
    a management system that controls the cloud server so that the user is able to use the cloud server only within a recommendation right calculated by the calculation system,
    wherein the calculation system comprises:
    a reception module that receives analysis activity information, which is activity information generated while the user uses the cloud server, in order to determine the usage right;

a right module that uses a predetermined analysis method based on the analysis activity information to calculate a corresponding right, which is the usage right corresponding to the analysis activity information and applicable only to a specific user;

a prediction module that calculates a prediction right, which is a right to be imposed on the user, based on information about tasks undertaken by the user;

an inspection module that determines whether a predetermined trust condition that determines trust of the user is satisfied when a predetermined inspection condition determined by comparing the prediction right and the corresponding right is satisfied; and a transmission module that transmits the recommendation right calculated utilizing the corresponding right through a predetermined path, wherein the right module calculates the corresponding right respectively based on each computing device of the user connecting the cloud server and the corresponding right according to each time interval by utilizing the analysis activity information classified according to time intervals, wherein the predetermined inspection condition comprises a first inspection condition that is a condition in which a size of the corresponding right is larger than a size of the prediction right by a predetermined standard size or less, and a second inspection condition that is a condition in which the size of the corresponding right is larger than the size of the prediction right by exceeding the standard size, wherein the predetermined trust condition comprises a first trust condition, which is a condition that sizes of corresponding rights calculated for each computing device of the user do not differ by more than a first reference size, which is a predetermined size and a second trust condition, which is a condition that the sizes of the corresponding rights calculated according to a time interval do not differ by more than a second reference size, which is a predetermined size, wherein the right module determines the prediction right as the recommendation right when the size of the corresponding right is smaller than the size of the prediction right, wherein the right module determines the corresponding right as the recommendation right when the first inspection condition is satisfied and the first trust condition is satisfied, and wherein the right module determines the corresponding right as the recommendation right when the first inspection condition is not satisfied and the second inspection condition is satisfied, and the first trust condition and the second trust condition are satisfied.

7. A calculation method that is implemented by a calculation system which comprises hardware resources that include a processor and a memory to implement a reception module, a right module, a prediction module, an inspection module, and a transmission module, the calculation system being configured for a user using a cloud service to calculate a usage right for resources of a cloud server, the method comprising:

receiving, by the reception module, analysis activity information, which is activity information generated while the user uses the cloud server, in order to determine the usage right;

calculating, by the right module, a corresponding right, which is the usage right corresponding to the analysis activity information using a predetermined analysis method based on the analysis activity information and applicable only to a specific user;

calculating, by the prediction module, a prediction right, which is a right to be imposed on the user, based on information about tasks undertaken by the user;

determining, by the inspection module, whether a predetermined trust condition that determines trust of the user is satisfied when a predetermined inspection condition determined by comparing the prediction right and the corresponding right is satisfied;

determining, by the right module, a recommendation right by comparing the prediction right and the corresponding right; and transmitting, by the transmission module, the recommendation right to a predetermined path, wherein the corresponding right is calculated respectively based on each computing device of the user connecting the cloud server and calculated according to each time interval by utilizing the analysis activity information classified according to time intervals, by the right module, wherein the predetermined inspection condition comprises a first inspection condition that is a condition in which a size of the corresponding right is larger than a size of the prediction right by a predetermined standard size or less, and a second inspection condition that is a condition in which the size of the corresponding right is larger than the size of the prediction right by exceeding the standard size, wherein the predetermined trust condition comprises a first trust condition, which is a condition that sizes of corresponding rights calculated for each computing device of the user do not differ by more than a first reference size, which is a predetermined size and a second trust condition, which is a condition that the sizes of the corresponding rights calculated according to a time interval do not differ by more than a second reference size, which is a predetermined size, wherein the prediction right is determined as the recommendation right by the right module when the size of the corresponding right is smaller than the size of the prediction right, wherein the corresponding right is determined as the recommendation right by the right module when the first inspection condition is satisfied and the first trust condition is satisfied, and wherein the corresponding right is determined as the recommendation right by the right module when the first inspection condition is not satisfied and the second inspection condition is satisfied, and the first trust condition and the second trust condition are satisfied.

* * * * *